United States Patent
Di Pietro et al.

(10) Patent No.: US 10,673,728 B2
(45) Date of Patent: Jun. 2, 2020

(54) DYNAMIC SELECTION OF MODELS FOR HYBRID NETWORK ASSURANCE ARCHITECTURES

(71) Applicant: Cisco Technology, Inc., San Jose, CA (US)

(72) Inventors: Andrea Di Pietro, Lausanne (CH); Jean-Philippe Vasseur, Saint Martin D'uriage (FR); Javier Cruz Mota, Assens (CH); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 119 days.

(21) Appl. No.: 15/880,689

(22) Filed: Jan. 26, 2018

(65) Prior Publication Data
US 2019/0238443 A1 Aug. 1, 2019

(51) Int. Cl.
*H04L 12/26* (2006.01)
*H04L 12/24* (2006.01)

(52) U.S. Cl.
CPC .......... *H04L 43/14* (2013.01); *H04L 41/0213* (2013.01); *H04L 41/0853* (2013.01); *H04L 41/145* (2013.01); *H04L 41/16* (2013.01); *H04L 41/5019* (2013.01)

(58) Field of Classification Search
CPC . H04L 43/14; H04L 41/0213; H04L 41/0853; H04L 41/145; H04L 41/16
See application file for complete search history.

(56) References Cited

U.S. PATENT DOCUMENTS

| | | | |
|---|---|---|---|
| 7,788,722 B1 | 8/2010 | Njemanze et al. | |
| 2011/0305329 A1* | 12/2011 | Zoldi | H04M 3/22 379/114.04 |
| 2013/0205016 A1* | 8/2013 | Dupre | H04L 41/0896 709/224 |
| 2014/0222729 A1 | 8/2014 | Dasgupta et al. | |
| 2014/0237595 A1 | 8/2014 | Sridhara | |
| 2015/0135012 A1* | 5/2015 | Bhalla | H04L 41/147 714/26 |
| 2015/0195296 A1 | 7/2015 | Vasseur et al. | |
| 2015/0254555 A1* | 9/2015 | Williams, Jr. | G06N 3/0454 706/14 |
| 2016/0062815 A1 | 3/2016 | Ivanova | |
| 2016/0359695 A1* | 12/2016 | Yadav | H04L 43/04 |

(Continued)

OTHER PUBLICATIONS

European Search Report dated Mar. 25, 2019 in connection with European Application No. 19152659.

*Primary Examiner* — Nicholas R Taylor
*Assistant Examiner* — Sanjoy K Roy
(74) *Attorney, Agent, or Firm* — Behmke Innovation Group LLC; James M. Behmke; Jonathon P. Western

(57) ABSTRACT

In one embodiment, a local service of a network reports configuration information regarding the network to a cloud-based network assurance service. The local service receives a classifier selected by the cloud-based network assurance service based on the configuration information regarding the network. The local service classifies, using the received classifier, telemetry data collected from the network, to select a modeling strategy for the network. The local service installs, based on the modeling strategy for the network, a machine learning-based model to the local service for monitoring the network.

20 Claims, 11 Drawing Sheets

(56) References Cited

U.S. PATENT DOCUMENTS

| | | |
|---|---|---|
| 2017/0034193 A1 | 2/2017 | Schulman |
| 2017/0214702 A1 | 7/2017 | Moscovici |
| 2017/0220407 A1* | 8/2017 | Estrada ............... G06F 11/0751 |
| 2017/0279685 A1 | 9/2017 | Mota et al. |

* cited by examiner

DYNAMIC SELECTION OF MODELS FOR HYBRID NETWORK ASSURANCE ARCHITECTURES

TECHNICAL FIELD

The present disclosure relates generally to computer networks, and, more particularly, to the dynamic selection of models for network assurance architectures.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
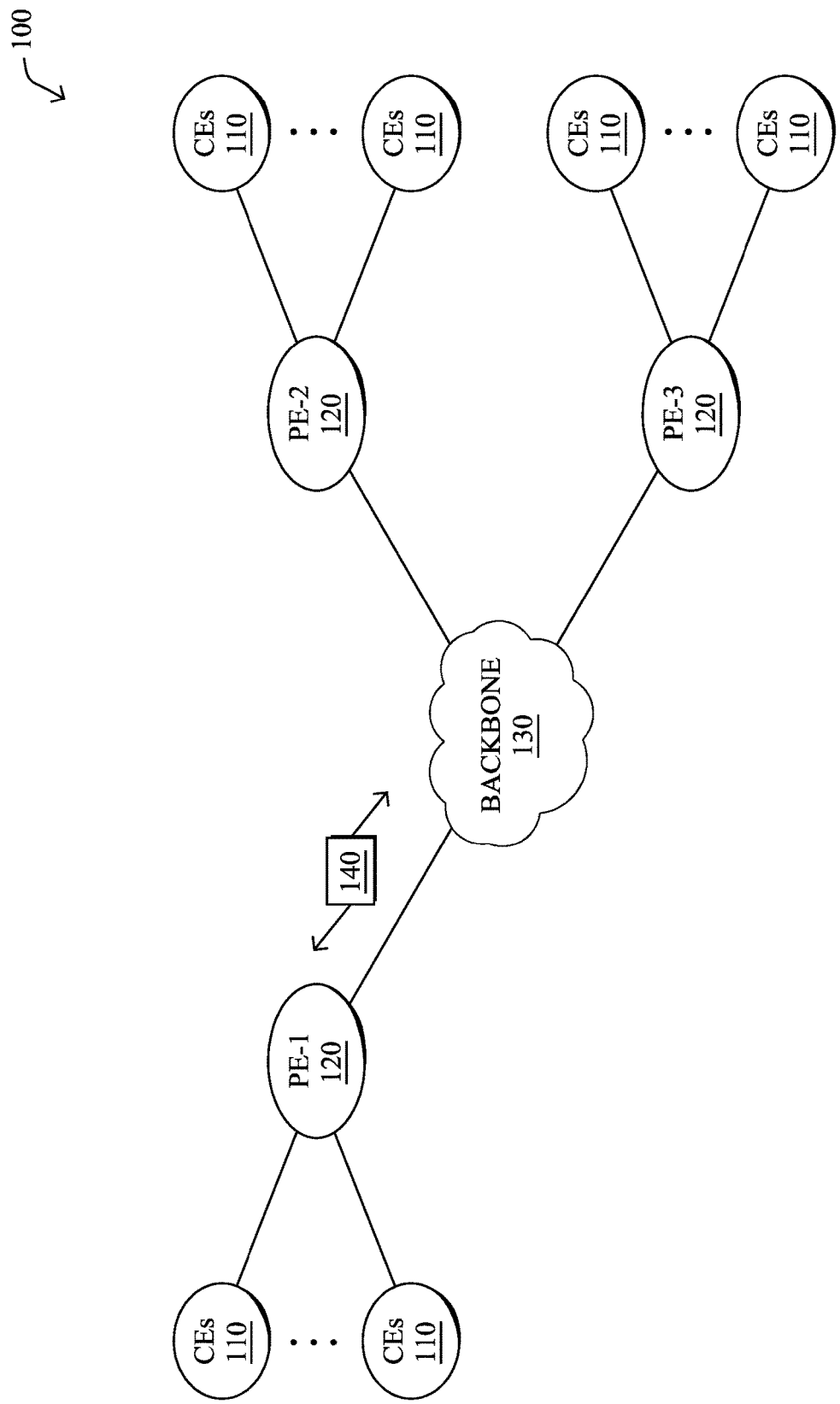
FIGS. 1A-1B illustrate an example communication network.

According to one or more embodiments of the disclosure, a local service of a network reports configuration information regarding the network to a cloud-based network assurance service. The local service receives a classifier selected by the cloud-based network assurance service based on the configuration information regarding the network. The local service classifies, using the received classifier, telemetry data collected from the network, to select a modeling strategy for the network. The local service installs, based on the modeling strategy for the network, a machine learning-based model to the local service for monitoring the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
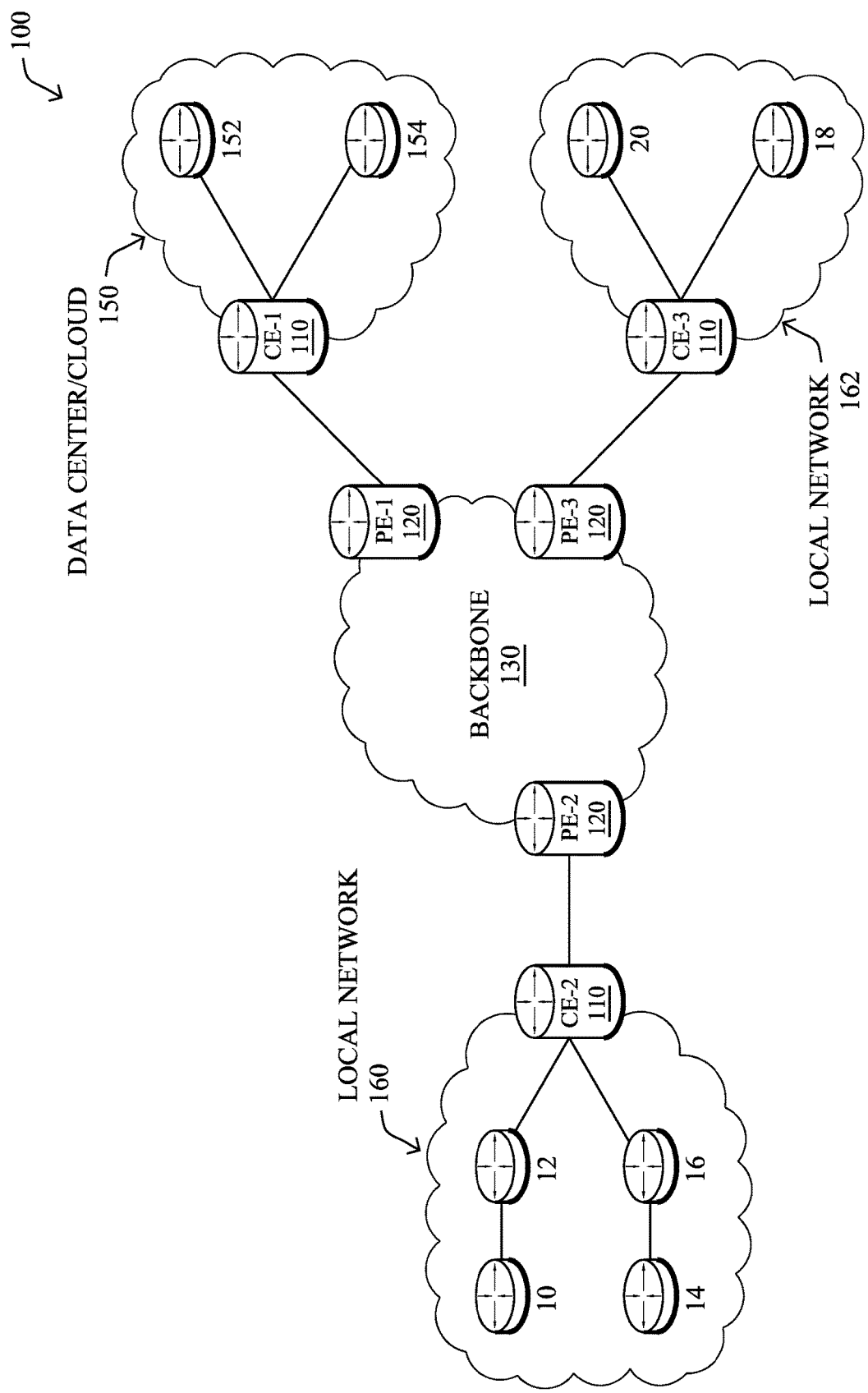

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network.

Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
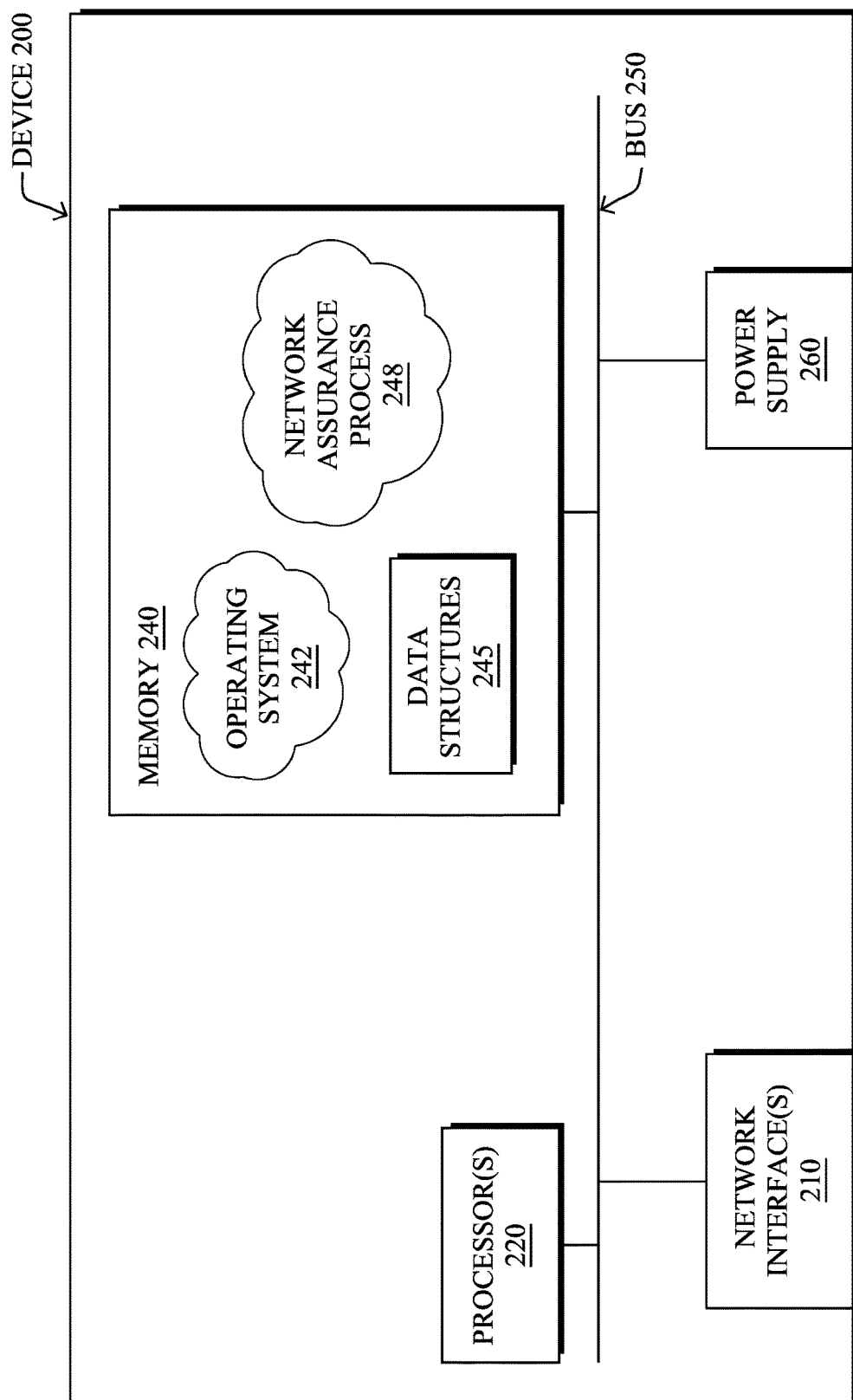
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
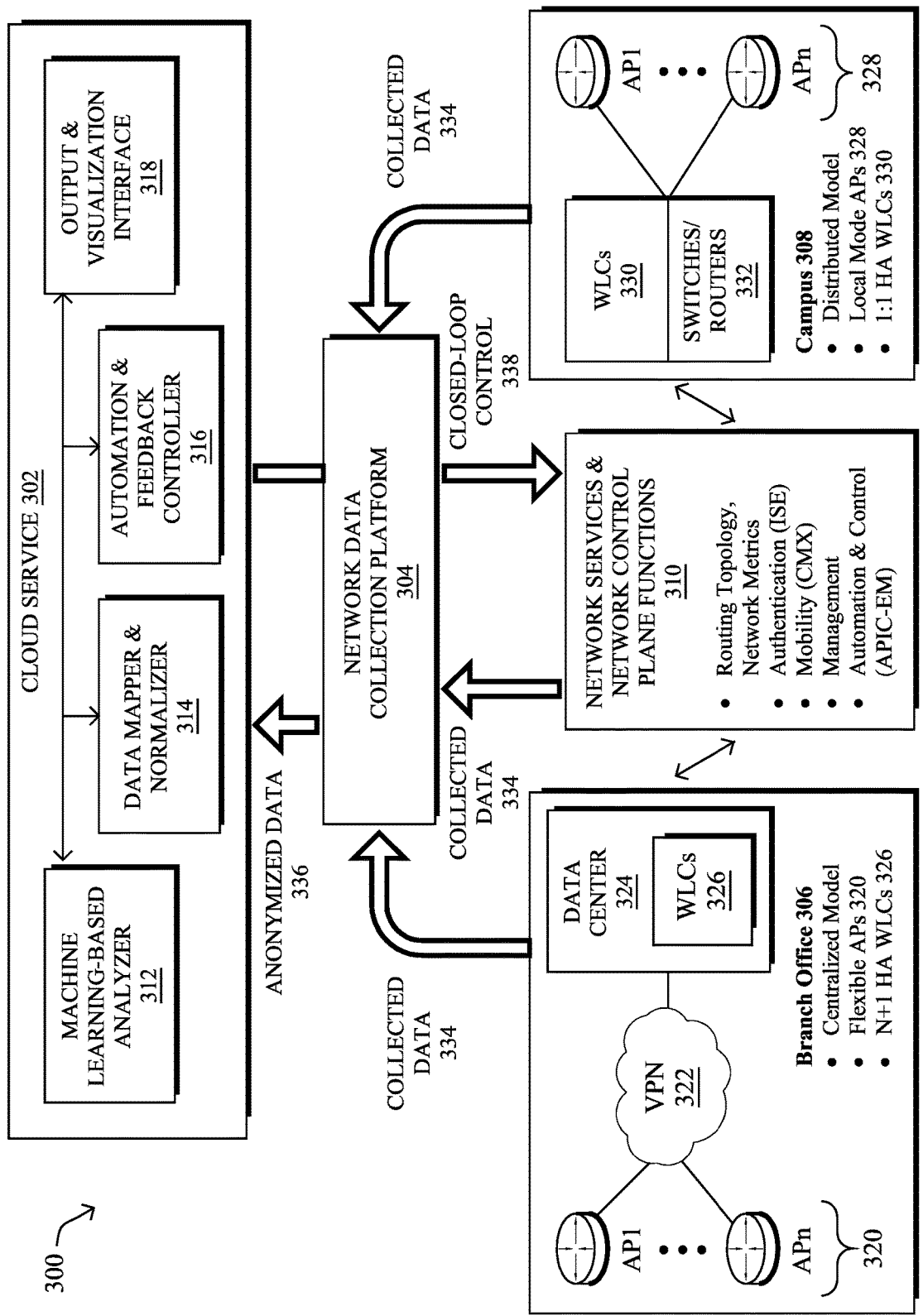
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IP Flow Information Export (IPFIX) exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, one implementation of a network assurance system is cloud-based and entails sending all data to a cloud service for analysis, potentially after anonymization of sensitive data in compliance with privacy standards, such as the General Data Protection Regulation (GDPR) in Europe. In a second approach, also referred to as "on premise," the machine learning analysis may be performed on a device hosted on the local network (e.g., in datacenter 324). Notably, some entities may prefer to prevent their data from being sent to the cloud, even with anonymization techniques in place. To implement "on premise" network assurance, the cloud-based models (e.g., of ML-based analyzer 312) may be sent to the hosting device in the local network, where local training can take place without requiring any uploading of telemetry data to the cloud.

Unfortunately, on premise implementations are not without drawbacks. First, there are typically fewer resources available at any given site than in the cloud for purposes of training complex machine learning models. Second, the training data available on the local network may be less diverse than that available to a cloud-based service, which can leverage cross learning using training data from any number of networks monitored by the service. Third, the amount of local data that can be stored in an on premise implementation is also likely to be more limited than that of a cloud-based implementation, thus limiting the scope of training data that can be used to train the machine learning model(s).

Dynamic Selection of Models for Hybrid Network Assurance Architectures

The techniques herein allow for a hybrid network assurance architecture whereby a thin, local/on premise client can still use machine learning models to locally assess the network and without requiring the sending of confidential data to the cloud. In some aspects, the on premise local agent may send a custom request to the cloud service that specifies the list of use cases of interest for the network. In turn, the cloud service may return a classifier to the local agent along with a set of modeling strategies corresponding to the various labels of the classifier. In further aspects, the local agent can then use the classifier to select an appropriate modeling strategy for the network and, in turn, install a machine learning-based model to analyze the network, in accordance with the selected modeling strategy.

Specifically, according to one or more embodiments of the disclosure as described in detail below, a local service of a network reports configuration information regarding the network to a cloud-based network assurance service. The local service receives a classifier selected by the cloud-based network assurance service based on the configuration information regarding the network. The local service classifies, using the received classifier, telemetry data collected from the network, to select a modeling strategy for the network. The local service installs, based on the modeling strategy for the network, a machine learning-based model to the local service for monitoring the network.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, FIGS. 4A-4F illustrates an example hybrid network assurance system 400, according to various embodiments. At the core of architecture 400 may be the following primary components: 1.) a local service 406 that operates on premise of the network to be monitored and 2.) a network assurance cloud service 302, as described previously. The sub-components of these two services may be implemented in a distributed manner or implemented as their own stand-alone services, in various embodiments. In addition, the functionalities of the components and sub-components of hybrid network assurance system 400 may be combined, omitted, or implemented as part of other processes, as desired.

Figure 4A:
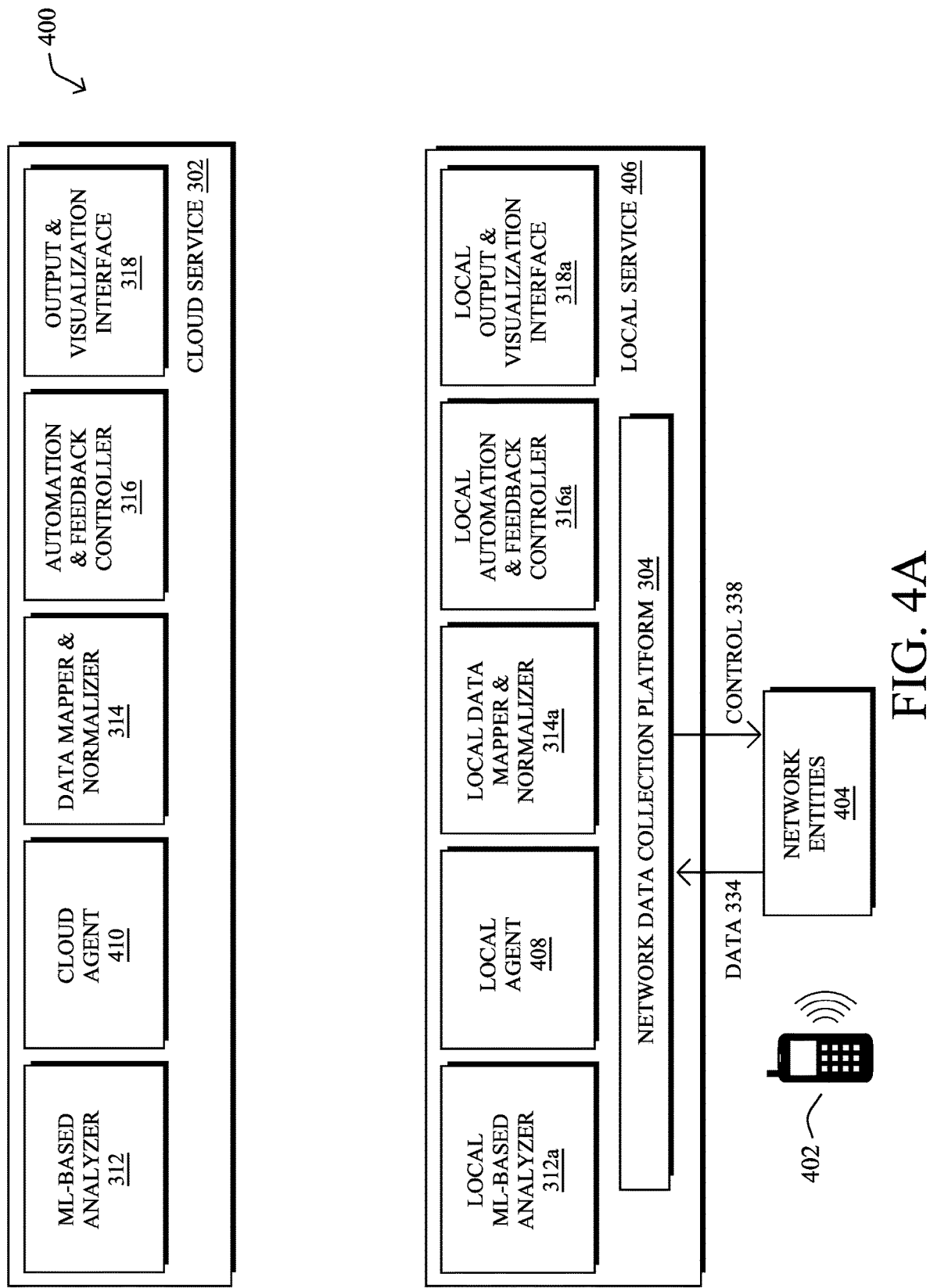
FIGS. 4A-4F illustrate an example hybrid network assurance system.

More specifically, as shown in FIG. 4A, a local service 406 may be implemented on premise of the network to be monitored. Accordingly, local service 406 may include the network data collection platform 304 described previously, which receives collected data 334 (e.g., telemetry data, configuration data, etc.) from the network entities 404 in the monitored network that provide connectivity to clients in the network, such as client 402 shown. For example, network entities 404 may include, but are not limited to, APs, WLCs/wireless controllers, switches, routers, and the like. In addition, network data collection platform 304 of local service 406 may also control the operation of network entities 404 via control commands 338, based on the monitoring.

Typically, local service 406 may include local versions of the various modules of cloud service 302. For example, as shown, local service 406 may include a local machine learning-based analyzer 312*a*, a local data mapper and normalizer 314*a*, a local automation and feedback controller 316*a*, and/or a local output and visualization interface 318*a*. Such modules may generally offer the same functionality as those of cloud service 302, but may also be scaled down, in some cases, and offer more limited functionality (e.g., only certain visualizations, machine learning models that are only pertinent to the specific network, etc.). In various embodiments, each of services 302, 406 may also include an agent configured to facilitate collaboration between services 302, 406. Notably, local service 406 may include a local agent 408 configured to communicate with a cloud agent 410 of cloud service 302.

As noted, reliance on a cloud-based network assurance service allows for cross learning using data sets from any number of different networks monitored by the cloud-based service. Unfortunately, in many situations, there is not one machine learning-based model that fits all use cases, thereby requiring a separate model for each use case. For example, consider the case of an anomaly detection model that looks for statistical deviations in the assessed network data (e.g., to detect when the behavior of the monitored network is no longer "normal"). Finding anomalies using such a model usually requires different parameter settings, depending on the use case. In particular, the time windows assessed by the model, the percentile values used to define what is anomalous, the type of anomaly detection approach taken, rescaling factors used by the model, etc., may be a function of the use case (e.g., the configuration of the monitored network, the nature of the network traffic, etc.). It has also been shown that the performance of such a model can drop considerably when applied to a different use case, such as using the model in another network with a very different traffic profile.

While model selection may typically be performed in the cloud, this selection is also dependent on data being sent from the monitored network to the cloud for analysis (e.g., after anonymization). However, as noted, this may not be desirable in all circumstances, thereby leading to the use of a hybrid network assurance system, such as system 400 shown. In such cases, model selection may instead be performed locally, on premise, using the information collected from the network.

Figure 4B:
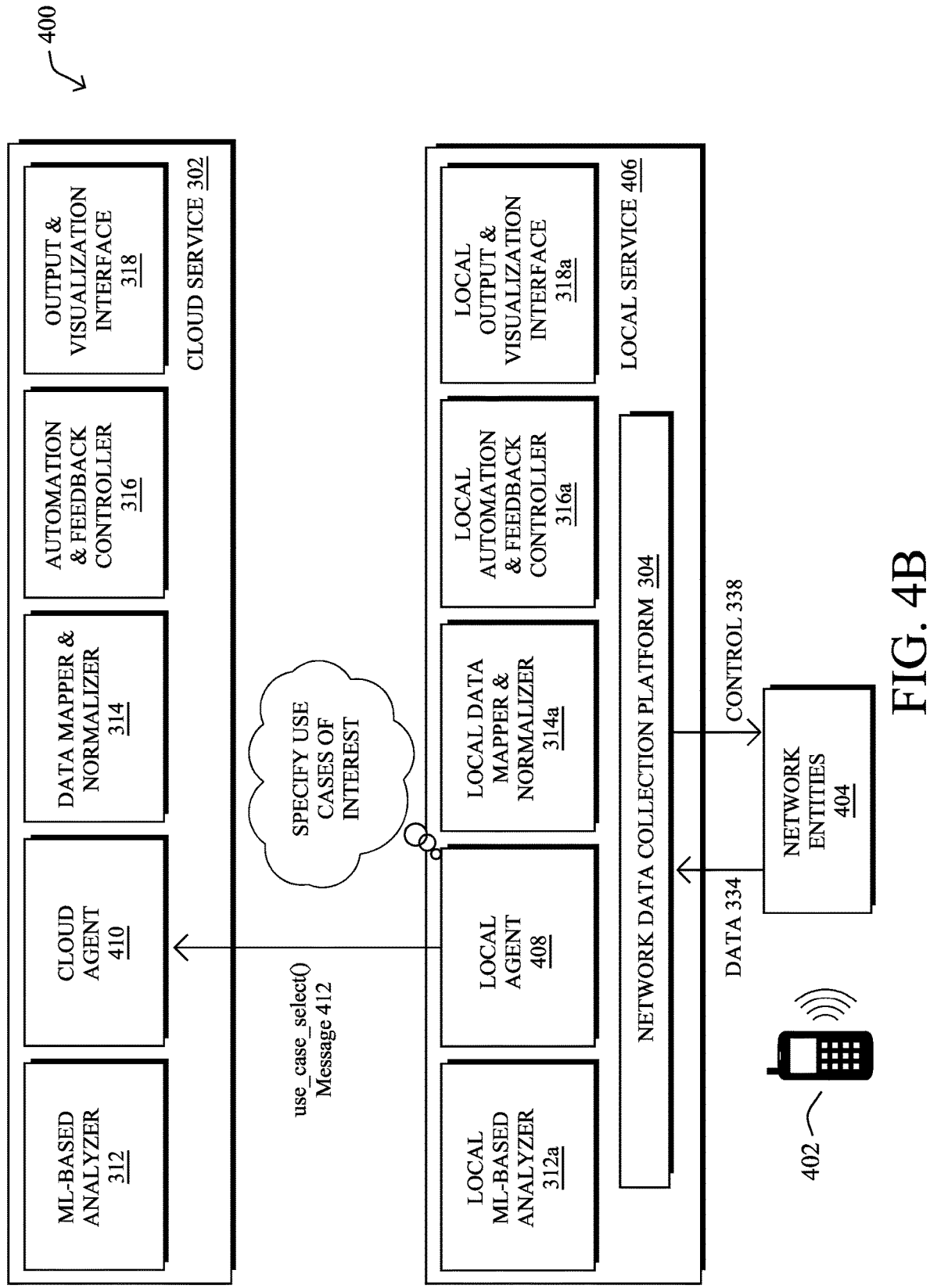

As shown in FIG. 4B, one aspect of the techniques herein introduces a custom message called a use_case_select( ) message 412 that may be sent by local agent 408 of local service 406 to cloud agent 410 of cloud service 302. In various embodiments, message 412 may convey to cloud agent 410 information regarding the use case for the local network. For example, message 412 may include information regarding any or all of the following:

The initial configuration of the network during installation (e.g., which devices are installed, the network layout, etc.).

Licensing constraints (e.g., in case different licenses are required for different use cases).

Data constraints (e.g., in case certain data is required for a particular use case, but is unavailable to the local service).

Figure 4C:
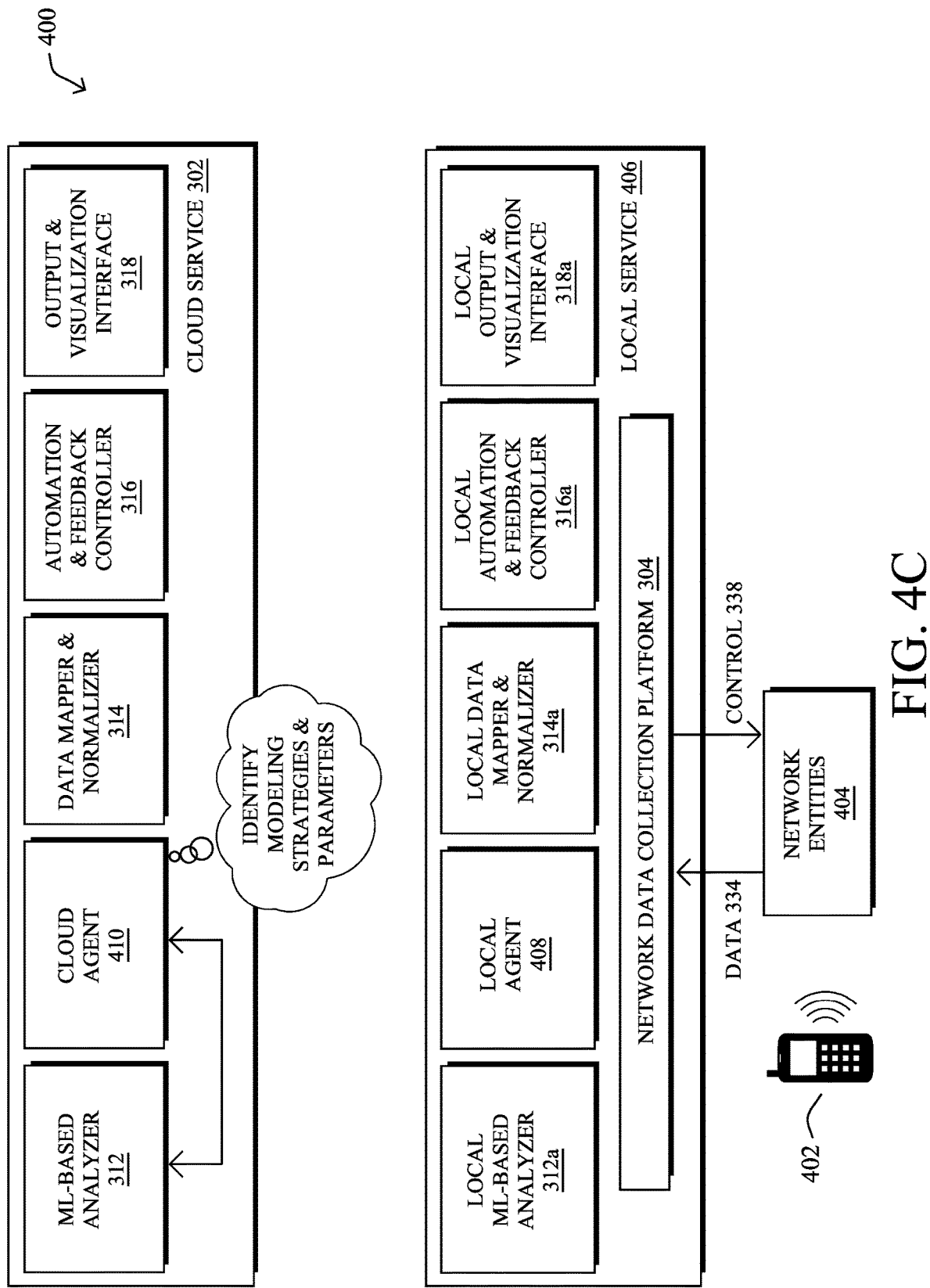

As shown in FIG. 4C, after receiving message 412, cloud agent 410 of cloud service 302 may compile a listing of modeling strategies, based on the use case information included in message 412. In addition, cloud agent 410 may also determine the appropriate list of parameters for the modeling strategies. In some embodiments, cloud agent 410 may, for a given strategy, even identify a pre-trained/pre-computed model from analyzer 312 that satisfies a given use case of interest. For example, assume that the on premise network is configured with a set of wireless APs to support conferencing traffic while clients roam throughout the network. In such a case, cloud agent 410 may identify the various modeling strategies that could be applicable to this use case, for purposes of monitoring the network. However, the specific modeling strategy that is applicable to the network may be a function of information that is restricted from sending to cloud service 302, such as information regarding actual user traffic patterns, etc.

Figure 4D:
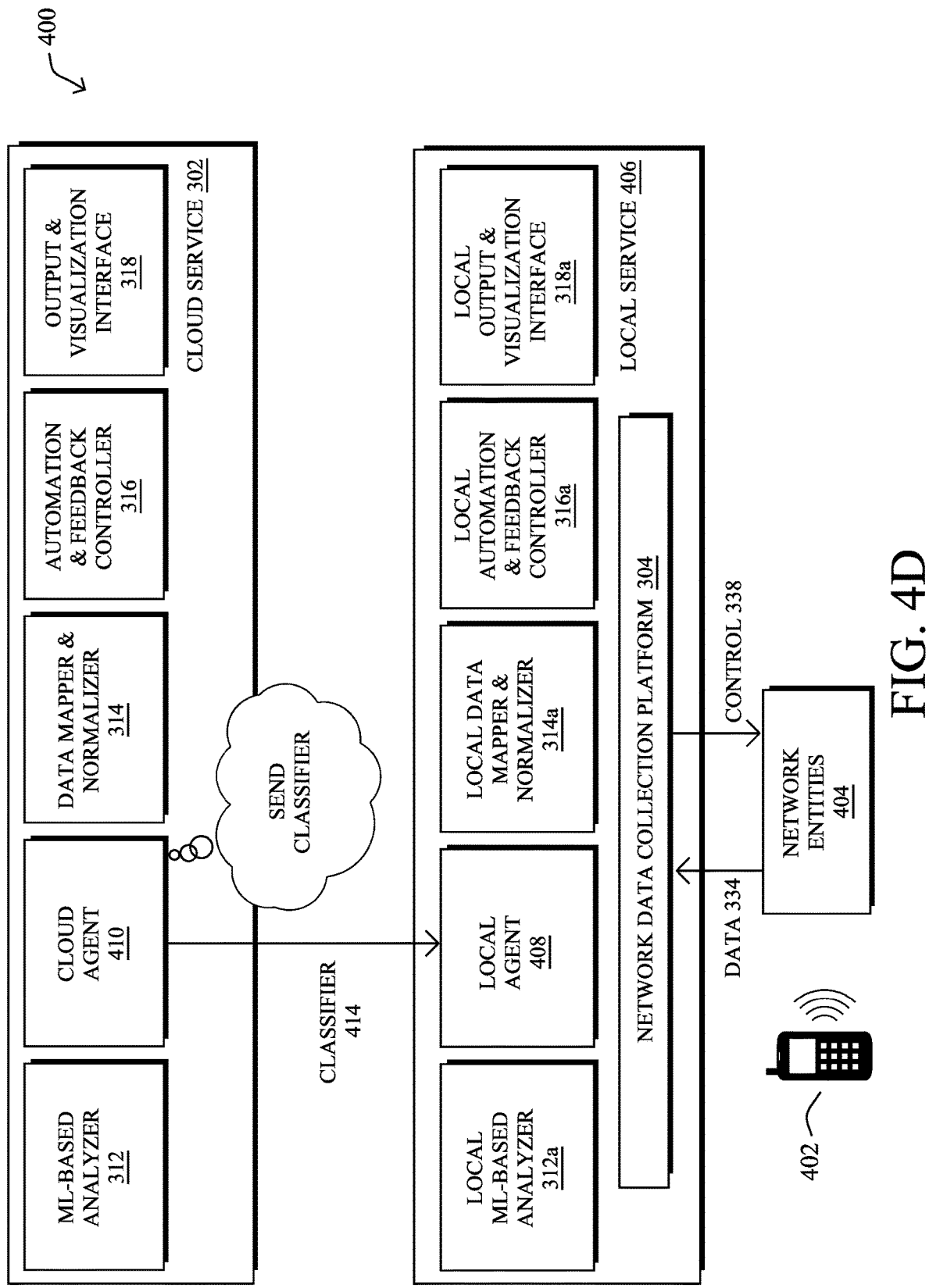

In various embodiments, as shown in FIG. 4D, cloud agent 410 may generate and send a classifier 414 back to local agent 408, based on the modeling strategies and parameters identified by cloud agent 410. In general, classifier 414 may be configured to take as input a set of input features (e.g., measurements/characteristics of the network of local service 406) and, based on a classification of these features, output a label that corresponds to a particular modeling strategy. Thus, while cloud service 302 is unable to directly select and install the appropriate model to local service 406 for monitoring the on premise network, it can send a classifier to service 406 that enables service 406 to determine what would be the most appropriate model for the monitoring.

Figure 4E:
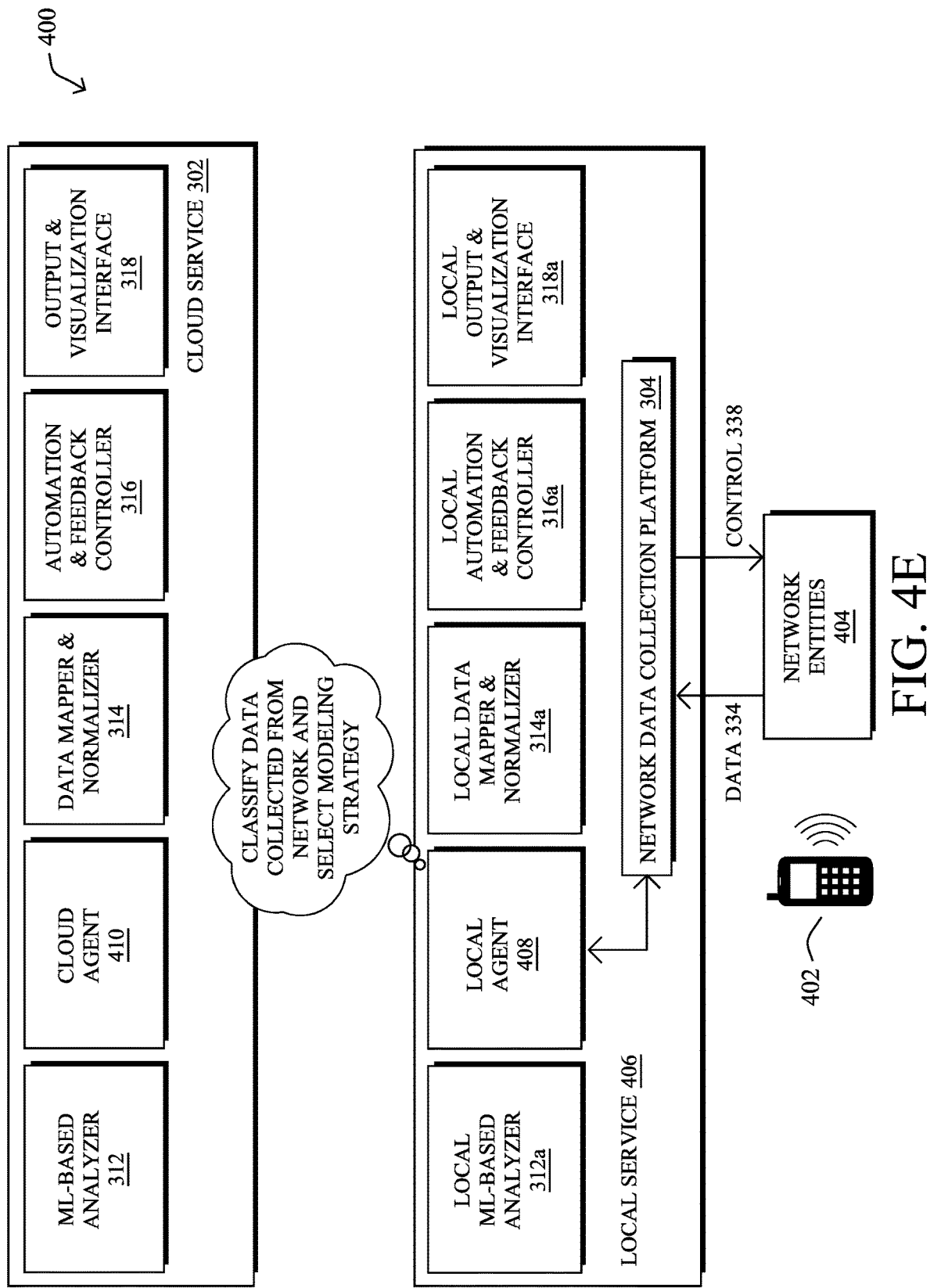

In response to receiving classifier 414, local agent 408 of local service 406 may perform any or all of the following:
  Evaluate the classifier using locally collected data from the network (e.g., data 334), which will provide an output O
  Select the modeling strategy with classifier output O and:
    If the modeling strategy corresponds to a set of learning parameters, perform a learning task on premise with the suggested parameters, which will produce a model M
    If the configuration corresponds to a pre-computed model (e.g., trained by cloud service 302 and provided to local agent 408 with classifier 414), take the pre-computed model directly as the model M
  Evaluate model M for the use case of interest More specifically, as shown in FIG. 4E, local agent 408 may interact with network data collection platform 304, to classify collected data 334 using classifier 414. In greater detail, local agent 408 may collect telemetry traffic data from network entities 404 (e.g. Netflow records, IPFIX records, etc.), other network characteristics, such as Simple Network Management Protocol (SNMP) information, Cisco Fusion information, etc., or any other information that can be used as input features for classifier 414. By classifying this data, classifier 414 can then output a label that indicates the modeling strategy that local service 406 should use to model and monitor the network.

By way of example, consider the case of a machine learning-based regression model that is to be used by analyzer 312a to predict the number of users that will have a bad roaming experience in the wireless network. In this case, the specific modeling strategy may vary depending on the type of APs deployed in the network, the traffic profile in the network, and/or other network characteristics that can significantly affect what regression model should be used in the network. In this case, classifier 414 aids in the selection process by taking into account a set of input feature characteristics of the network (e.g., the type of networking gear deployed in the network, a sample of the network traffic, configuration of the networking gear, etc.). For the sake of illustration, classifier 414 may even take as input feature the OS release used locally. Indeed, it has been shown that some modeling strategies may be specific to the OS release. In such a case, local agent 408 can determine which modeling strategy to use, without having to send this information to cloud service 302.

In one embodiment the list of candidate input features for classifier 414 is provided by local agent 408. In another embodiment, cloud agent 410 may provide the set of input features required by classifier 414 along with the classifier itself. In a further embodiment, an additional mechanism can be used to handle the case where the set of input features required by classifier 414 to select the appropriate modeling strategy is not locally available on local agent 408 (e.g., local agent 408 may not have access to the configuration of the switch that is used by the ML model). In this case, local agent 408 may provide the list of locally available classifier input features to cloud agent 410 (e.g., in conjunction with message 412). On receiving the list of available features, cloud agent 410 may trigger the computation of a custom classifier 414 using only the set of available features. Continuing the example whereby local agent 408 cannot access the configuration of a given switch, it may still be possible to compute a classifier 414 that does not require this input to select a modeling strategy. Note that the modeling strategy selection is performed by local agent 408 executing classifier 414, without requiring it to send any confidential data to cloud service 302.

Figure 4F:
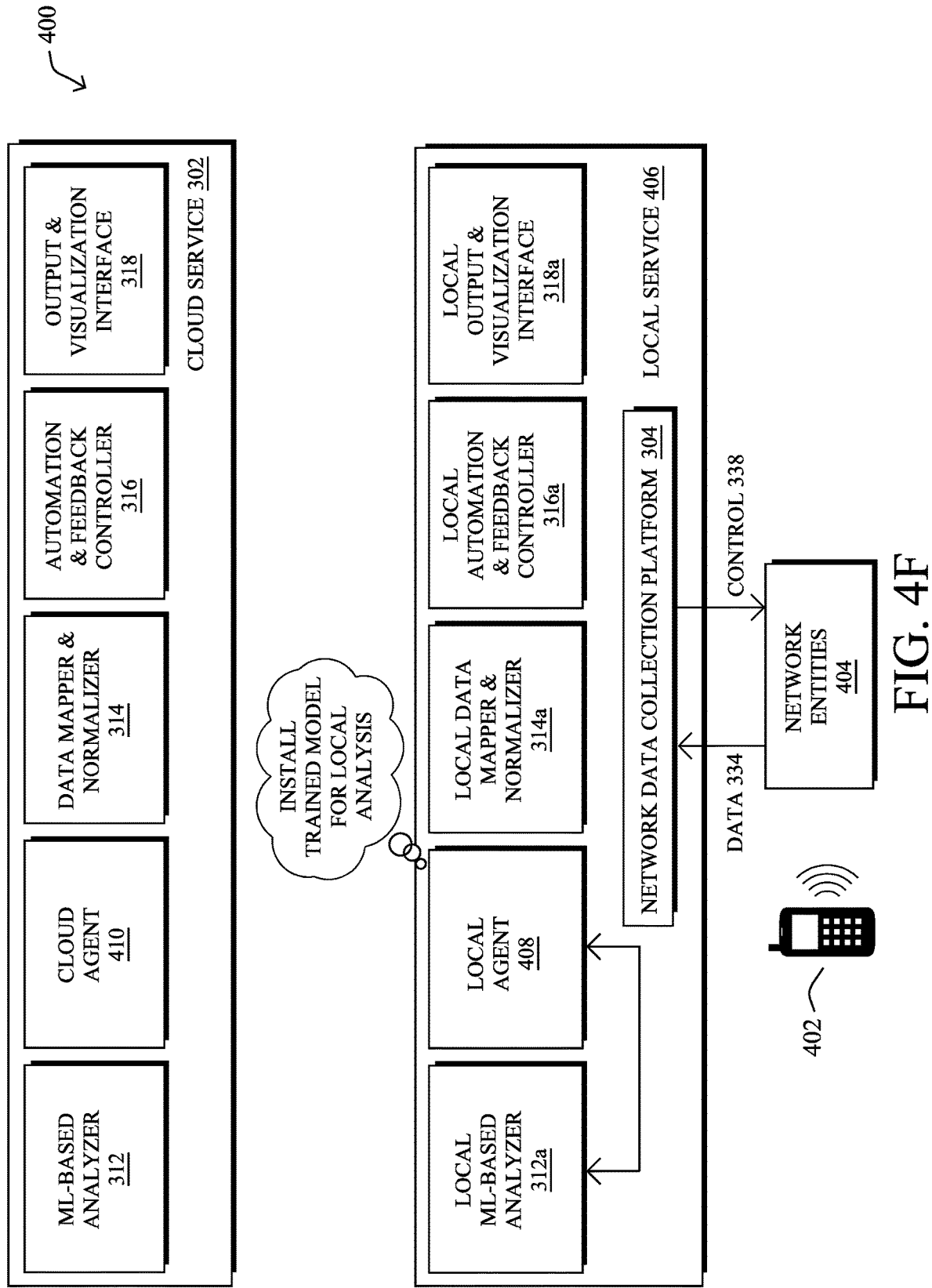

As shown in FIG. 4F, once local agent 408 has selected the appropriate modeling strategy, it may install the corresponding machine learning-based model to local analyzer 312a, to begin monitoring the network. As noted, in some cases, cloud agent 410 may send a pre-trained model in conjunction with classifier 414. In such a case, cloud agent 410 may simply install this model to analyzer 312a, when the output of classifier 414 indicate that this model should be used. In further embodiments, however, the modeling strategy selected by classifier 414 may indicate how local agent 408 should train the model using information collected from the monitored network. Once trained, local agent 408 may then install the model to local analyzer 412a, in a similar manner.

Since the local conditions of the network are subject to change over time, local agent 408 may re-perform the above functions after expiration of a configurable timer, in some embodiments. For example, after expiration of the timer, local agent 408 may re-run classifier 414 on more current information from the network and, if the classification results have changed, select and install a new model to analyzer 312a. The major caveat, though, is that, this can result in the loss of history used by the model. For example, retraining a new anomaly detection model from scratch may result in a loss of the prior notion of what is considered "normal" in the network (e.g., by changing which network characteristics are assessed by the anomaly detector, etc.).

In yet another embodiment, local agent 408 may use an anomaly detection process on the input features for classifier 414, itself, to determine whether the profile of the local network has changed. Indeed, if cloud agent 410 has provided a classifier 414 that assesses n-number of features $F_1$, ..., $F_n$ to select the appropriate modeling strategy for the network, such variables are likely to greatly influence the selection process. Thus, local agent 408 may specifically monitor changes in these features and, on detecting significant changes, local agent 408 may even request a new classifier from cloud service 302.

Figure 5:
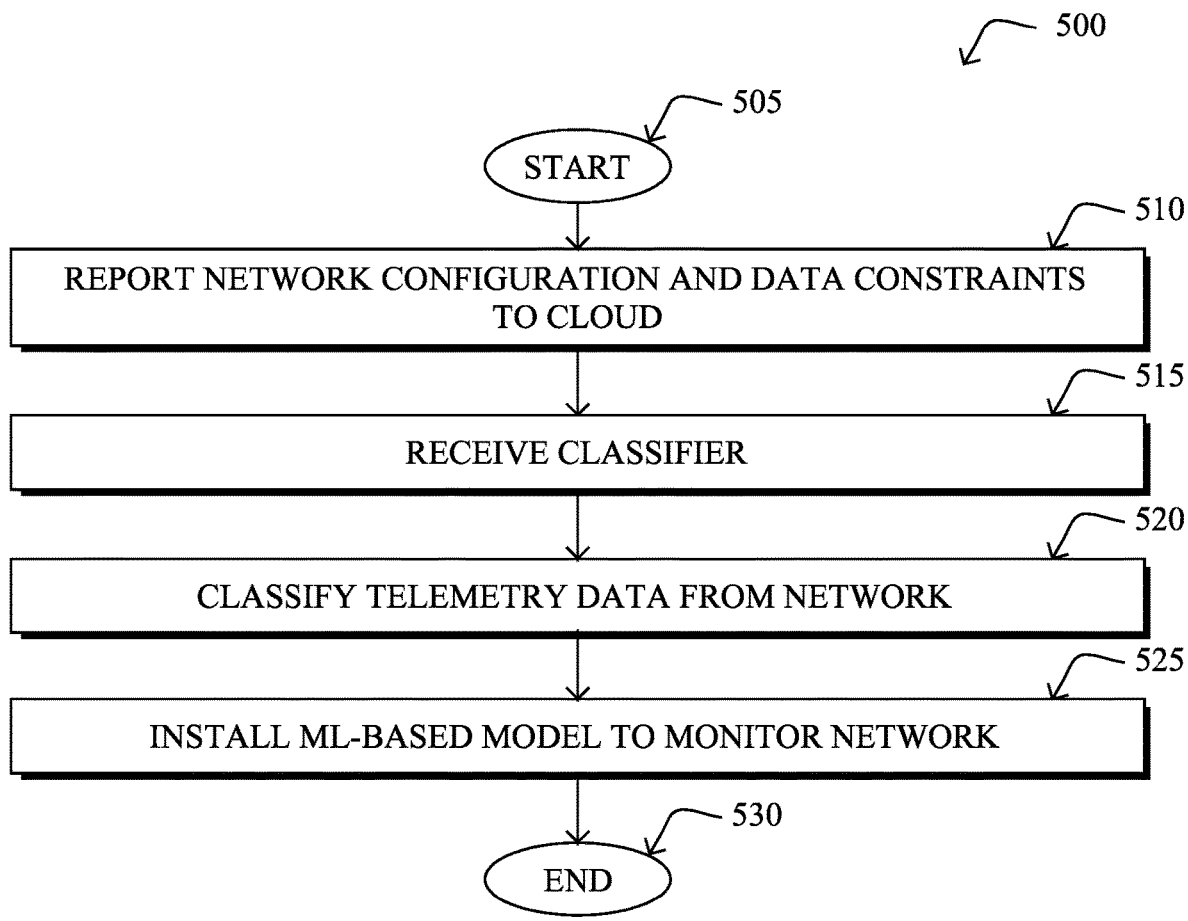
FIG. 5 illustrates an example simplified procedure for model selection in a hybrid network assurance system.

FIG. 5 illustrates an example simplified procedure for model selection in a hybrid network assurance system in a network in accordance with one or more embodiments described herein. For example, a non-generic, specifically configured device (e.g., device 200) that implements a local service in a network may perform procedure 500 by executing stored instructions (e.g., process 248). The procedure 500 may start at step 505, and continues to step 510, where, as described in greater detail above, the local service may report configuration information regarding the network to a cloud-based network assurance service. The configuration information may indicate, for example, the networking equipment installed in the network (e.g., APs, wireless controllers, switches, etc.), the layout of the equipment, the number of users in the network, or any other configuration information regarding the network. Further information that the local service may report can include data constraint information, such as when certain information is not available to the local service regarding the network. In further cases, the local service may also report license information to the cloud-based service.

At step 515, as detailed above, the local service may receive a classifier selected by the cloud-based network assurance service based on the configuration information regarding the network. In general, the classifier may be configured to take as input any number of input features (e.g., characteristics of the network, such as telemetry data, configuration information, etc.) and output a label corresponding to a modeling strategy. In some cases, the modeling strategy may simply specify a pre-trained model from the cloud service for installation to the local service to monitor the network. In further cases, the modeling strategy may specify how the local service should train a model for installation to the local service to monitor the network.

At step 520, the local service may use the classifier to classify telemetry data collected from the network, to select a modeling strategy for the network, as described in greater detail above. For example, the local service may classify Netflow, IPFIX, or any other form of telemetry data from the network. In further cases, the local service may also classify information such as SNMP data, or the like, from the network.

At step 525, as detailed above, the local service may install, based on the modeling strategy for the network, a machine learning-based model to the local service for monitoring the network. For example, the local service may install a model trained by the cloud-based service or trained locally for monitoring the network. The local service may then use the model to monitor the network and, based on the monitoring, control operation of the network (e.g., by moving a client to a different AP, changing a routing path or data rate, etc.). Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the local selection of models for purposes of performing local network assurance/monitoring, without requiring the local network assurance service to send sensitive information regarding the network to the cloud.

While there have been shown and described illustrative embodiments that provide for model selection in a network assurance system, it is to be understood that various other adaptations and modifications may be made within the spirit and scope of the embodiments herein. For example, while certain embodiments are described herein with respect to using certain models for purposes of anomaly detection or network monitoring, the models are not limited as such and may be used for other functions, in other embodiments. In addition, while certain protocols are shown, such as SNMP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   reporting, by a local service of a network, configuration information regarding the network to a cloud-based network assurance service;
   receiving, at the local service, a classifier generated by the cloud-based network assurance service based on a plurality of modeling strategies that are selected by the cloud-based network assurance service according to the configuration information reported by the local service;
   classifying, by the local service and using the received classifier, telemetry data collected from the network to select a modeling strategy for the network among the plurality of modeling strategies selected by the cloud-based network assurance service; and
   installing, by the local service and based on the modeling strategy for the network, a machine learning-based model to the local service for monitoring the network.

2. The method as in claim 1, wherein the installed machine learning-based model is a machine learning-based anomaly detector or a trained machine learning-based classifier that assesses traffic information from the network.

3. The method as in claim 1, further comprising:
   reporting, by the local service and to the cloud-based network assurance service, a set of potential input features for the classifier that are available to the local service.

4. The method as in claim 1, further comprising:
   receiving, at the local service and from the cloud-based network assurance service, the machine learning-based model, wherein the cloud-based network assurance service trained the model, and wherein the modeling strategy specifies the trained model for installation.

5. The method as in claim 1, wherein installing, by the local service and based on the modeling strategy for the network, the machine learning-based model to the local service for monitoring the network comprises:
   training, by the local service, the machine learning-based model according to the modeling strategy, wherein the modeling strategy is determined by an output of the received classifier.

6. The method as in claim 5, wherein the modeling strategy specifies at least one of: a time window, percentile value, type of anomaly detection, or rescaling factor to be used by the machine learning-based model.

7. The method as in claim 1, further comprising:
   detecting, by the local service, a change in input features from the network for the classifier; and, in response,
   requesting, by the local service, a new classifier from the cloud-based network assurance service.

8. The method as in claim 1, further comprising:
   identifying, by the local service, expiration of a reporting timer, wherein the local service reports the configuration information regarding the network to the cloud-based network assurance service after expiration of the reporting timer.

9. The method as in claim 1, wherein classifying the telemetry data collected from the network, to select a modeling strategy for the network, further comprises:

classifying, using the received classifier, Simple Network Management Protocol (SNMP), Internet Protocol Flow Information Export (IPFIX), or Netflow information from the network.

10. The method as in claim 1, further comprising:
using, by the local service, the installed machine learning-based model to monitor the network; and
controlling, by the local service, operation of the network based on the monitoring.

11. An apparatus, comprising:
one or more network interfaces to communicate with a network;
a processor coupled to the network interfaces and configured to execute one or more processes; and
a memory configured to store a process executable by the processor, the process when executed configured to:
report configuration information regarding the network to a cloud-based network assurance service;
receive a classifier generated by the cloud-based network assurance service based on a plurality of modeling strategies that are selected by the cloud-based network assurance service according to the configuration information reported by the local service;
classify, using the received classifier, telemetry data collected from the network to select a modeling strategy for the network among the plurality of modeling strategies selected by the cloud-based network assurance service; and
install, based on the modeling strategy for the network, a machine learning-based model for monitoring the network.

12. The apparatus as in claim 11, wherein the installed machine learning-based model is a machine learning-based anomaly detector or a trained machine learning-based classifier that assesses traffic information from the network.

13. The apparatus as in claim 11, wherein the apparatus receives the classifier selected by the cloud-based network assurance service by:
receiving, from the cloud-based network assurance service, a set of input features required by the classifier.

14. The apparatus as in claim 11, wherein the process when executed is further configured to:
receive, from the cloud-based network assurance service, the machine learning-based model, wherein the cloud-based network assurance service trained the model, and wherein the modeling strategy specifies the trained model for installation.

15. The apparatus as in claim 11, wherein the apparatus installs, based on the modeling strategy for the network, the machine learning-based model for monitoring the network by:
training the machine learning-based model according to the modeling strategy, wherein the modeling strategy is determined by an output of the received classifier.

16. The apparatus as in claim 15, wherein the modeling strategy specifies at least one of: a time window, percentile value, type of anomaly detection, or rescaling factor to be used by the machine learning-based model.

17. The apparatus as in claim 11, wherein the process when executed is further configured to:
detect a change in input features from the network for the classifier; and, in response,
request a new classifier from the cloud-based network assurance service.

18. The apparatus as in claim 11, wherein the process when executed is further configured to:
identify an expiration of a reporting timer, wherein the configuration information regarding the network is reported to the cloud-based network assurance service after expiration of the reporting timer.

19. The apparatus as in claim 11, wherein the apparatus classifies the telemetry data collected from the network, to select a modeling strategy for the network, by:
classifying, using the received classifier, Simple Network Management Protocol (SNMP), Internet Protocol Flow Information Export (IPFIX), or Netflow information from the network.

20. A tangible, non-transitory, computer-readable medium storing program instructions that cause a local service in a network to execute a process comprising:
reporting, by the local service of the network, configuration information regarding the network to a cloud-based network assurance service;
receiving, at the local service, a generated selected by the cloud-based network assurance service based on a plurality of modeling strategies that are selected by the cloud-based network assurance service according to the configuration information reported by the local service;
classifying, by the local service and using the received classifier, telemetry data collected from the network to select a modeling strategy for the network among the plurality of modeling strategies selected by the cloud-based network assurance service; and
installing, by the local service and based on the modeling strategy for the network, a machine learning-based model to the local service for monitoring the network.

* * * * *